US005371530A

United States Patent [19]

Hawkins et al.

[11] Patent Number: 5,371,530

[45] Date of Patent: Dec. 6, 1994

[54] THERMAL INK JET PRINTHEAD HAVING A SWITCHED STAND-BY MODE

[75] Inventors: William G. Hawkins, Webster; Thomas A. Tellier, Williamson, both of N.Y.

[73] Assignee: Xerox Corporation, Stamford, Conn.

[21] Appl. No.: 55,891

[22] Filed: May 4, 1993

[51] Int. Cl.[5] .............................................. G01D 15/16
[52] U.S. Cl. .......................................... 347/9; 347/57
[58] Field of Search ................. 346/140 R; 347/17, 9, 347/56, 57

[56] References Cited

U.S. PATENT DOCUMENTS

| | | | |
|---|---|---|---|
| 4,250,512 | 2/1981 | Kattner et al. | 346/140 P |
| 4,835,549 | 5/1989 | Samejima et al. | 346/76 PH |
| 5,036,337 | 7/1991 | Rezanka | 347/17 |

*Primary Examiner*—Benjamin R. Fuller
*Assistant Examiner*—Craig Hallacher
*Attorney, Agent, or Firm*—Oliff & Berridge

[57] ABSTRACT

A thermal ink jet printhead includes a switched power supply for the intermediate voltage predriver sections. The power supply is switched by a MOSFET connected between an intermediate point of a voltage divider and ground. By switching the power supply, the predriver sections are turned off, unnecessary power consumption and overheating the printhead are avoided.

15 Claims, 4 Drawing Sheets

THERMAL INK JET PRINTHEAD HAVING A SWITCHED STAND-BY MODE

BACKGROUND OF THE INVENTION

1. Field of the Invention

This invention generally relates to a printer having a thermal ink jet printhead, and more particularly to a thermal ink jet printer printhead having a switch stand-by mode for reducing the power consumption and the temperature of the printhead during stand-by periods of the printer.

2. Description of Related Art

A known thermal ink jet printer uses a compact and reliable microelectronic printhead. The printhead contains four essential elements: robust static voltage spike protection, logic addressing circuitry, power MOS drivers, and heater elements for heating the ink. These essential elements are formed on a microelectronic heater die formed from a silicon wafer.

The logic addressing circuitry is used to control the firing of the heater elements by turning on and off the power MOS drivers. Predriver circuitry is used to boost the five volt logic level signals output by the logic addressing circuitry to voltage levels sufficient to drive the power MOS drivers.

In the conventional thermal ink jet printer, the intermediate power supply to the predriver circuitry is left permanently on, regardless of whether the printer is in a printing operation or in a stand-by mode between printing operations. The power supply continuously supplies power to the predriver circuits even when the printer is in a stand-by mode even though they are not actively driving the heater elements. This continuous power draw of the predriver circuitry in the stand-by mode is undesirable, both because it needlessly wastes power and because the needlessly wasted power is converted to heat, eventually overheating the printhead.

When the printhead overheats, various Droblems result. First, the resolution of the printer depends on the spot size of an ejected droplet of ink. Nominally, the spot size it about 130 μm. The spot size depends upon the viscosity of the ink. In turn, the viscosity of the ink depends upon the temperature of the ink, which is approximately equal to the temperature of the printhead. Thus, when the printhead temperature increases, the viscosity of the ink decreases and the spot size of the resulting ink droplet increases. This increased spot size reduces the optical quality of printing.

Further, ink jet printers generate many colors by mixing together droplets of a number of different colors of ink ejected from different printhead heater elements. Thus, the increased printhead operating temperature reduces the color stability by changing the proportion of inks mixed together to form a particular color.

Second, when the temperature of the printhead rises above a critical temperature (the ingestion temperature) the printhead takes in air and then is unable to operate until reprimed. Therefore, the image quality of the image formed degrades and soft failure modes occur.

Third, when the printhead temperature increases during a stand-by or non-printing mode, the volatile constituents (generally, water) of the liquid thermal ink evaporate from the printhead and condense on the cooler surrounding surfaces. Thus not only does the increased printhead temperature reduce the reliability of the printhead through drying out of the ink, but the surrounding surfaces become contaminated with the volatiles evaporated from the ink.

SUMMARY OF THE INVENTION

The invention therefore provides a thermal ink jet printhead having a switched stand-by mode for switching on and off the intermediate power supply.

The invention also provides a thermal ink jet printhead having a controllable switch for the intermediate power supply, the control signal for the switch comprising one of a plurality of control signals normally provided to the thermal ink jet printhead.

The invention further provides a thermal ink jet printhead having a switched stand-by mode, the switch including voltage divider and a source follower.

These and other objectives and advantages are provided, in a first embodiment of the invention, by a thermal ink jet printhead having at least one power input terminal, a plurality of control signal input terminals, logic circuitry connected to the plurality of control signal input terminals and one of the at least one power input terminal, a plurality of heater circuits comprising a heater element and a power driver MOSFET connected in series and connected between one of the at least one power input terminal and ground, and an intermediate power supply connected to one of the at least one power input terminal, a plurality of predriver circuits connected between the MOSFETs of the plurality of heater circuits and the logic circuitry, wherein the intermediate power supply is connected to and switched by one of the plurality of control signal terminals.

These and other features and advantages of mentioned are described in or apparent from the following detailed description of the preferred embodiments.

BRIEF DESCRIPTION OF THE DRAWINGS

The preferred embodiments are described in reference to the drawings, in which.

DETAILED DESCRIPTION OF THE PREFERRED EMBODIMENTS

Figure 3:
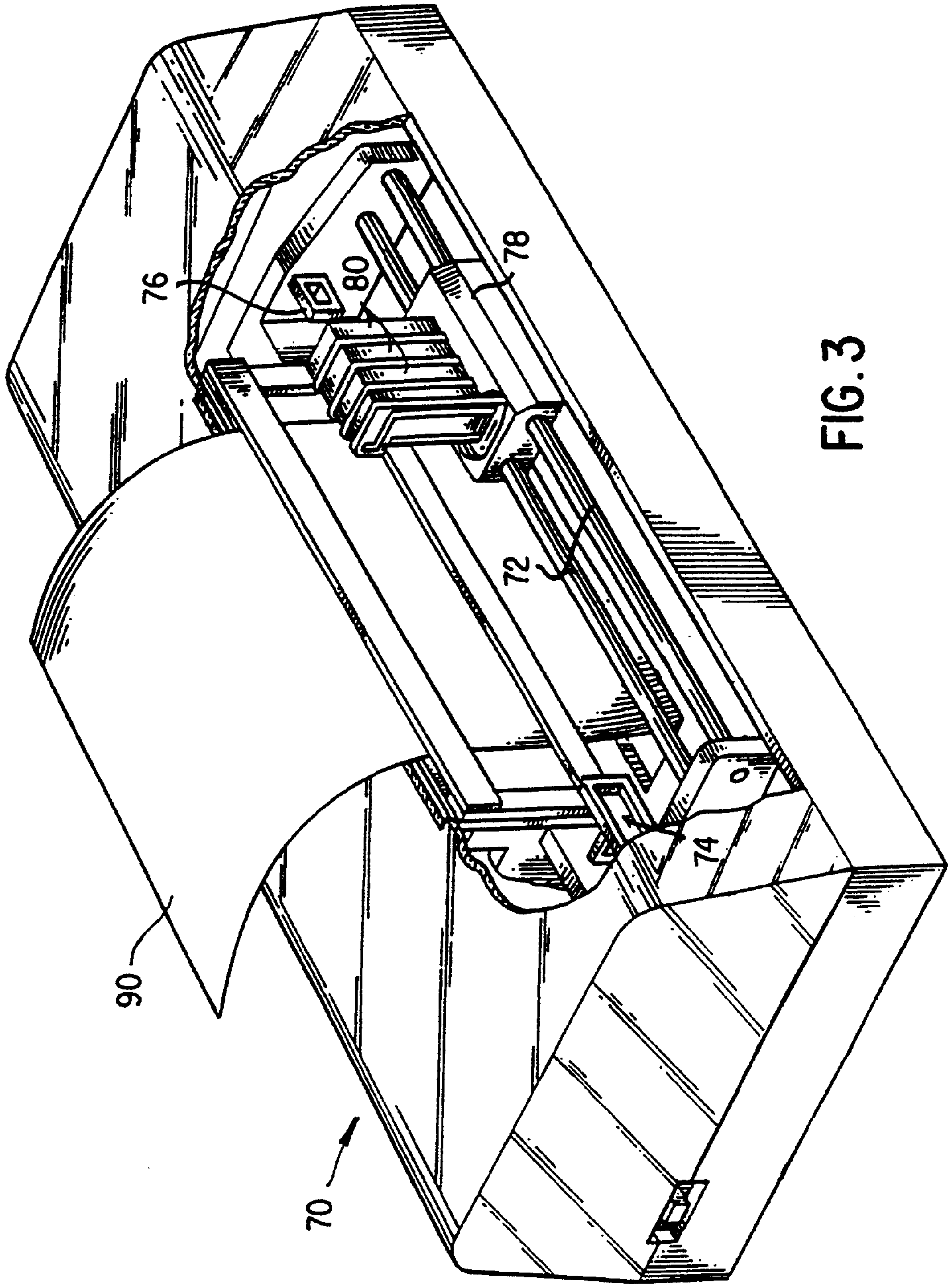
FIG. 3 is a perspective view of a thermal ink jet printer incorporatng the thermal ink jet printhead having the switch stand-by mode.

As shown in FIG. 3, a thermal ink jet printer 70 has a printhead 80 mounted on a carriage 78. The carriage 78 moves laterally left and right on a pair of guide rods 72. A capping station having a capping device 74 is located on the far left end of the guide rods 72. When the printer 70 is turned off, the carriage 78 moves the printhead 80 to the capping station, where the cap 74 is placed on the printhead 80 to protect it and to prevent the liquid ink from evaporating from the printhead 80. A maintenance station with a maintenance device 76 is located on the far right hand side of the guide rods 72. When the printer 70 is on, the carriage 78 moves the printhead 80 to the maintenance station during a "stand-by" mode. The printer is placed into the stand-by mode whenever it is on and is not actively printing. When the printer 70 is actively printing, the carriage 78 moves the printhead 80 laterally across a sheet of paper 90 or the like. The printhead 80 ejects ink droplets from the printhead 80 onto the paper 90 to form an image.

Figure 4:
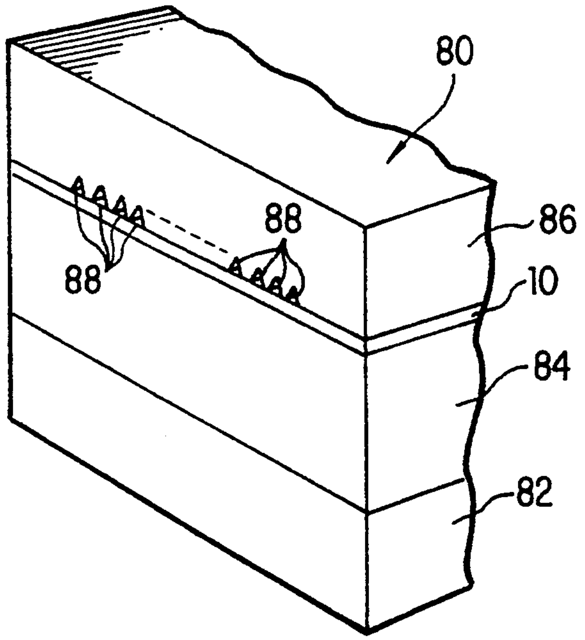
FIG. 4 is the perspective view of a thermal ink jet printhead.

As shown in FIG. 4, the printhead 80 comprises a top portion 86. A plurality of nozzles 88 are formed in the top portion 86. The printhead 80 has a heater die 84. The heater die 84 is attached to a heat sink 82 and has multiple circuit elements formed on a surface layer 10. The top portion 86 of the printhead 80 is matched to the top surface of the heater die 84 to complete the printhead 80.

Figure 5:
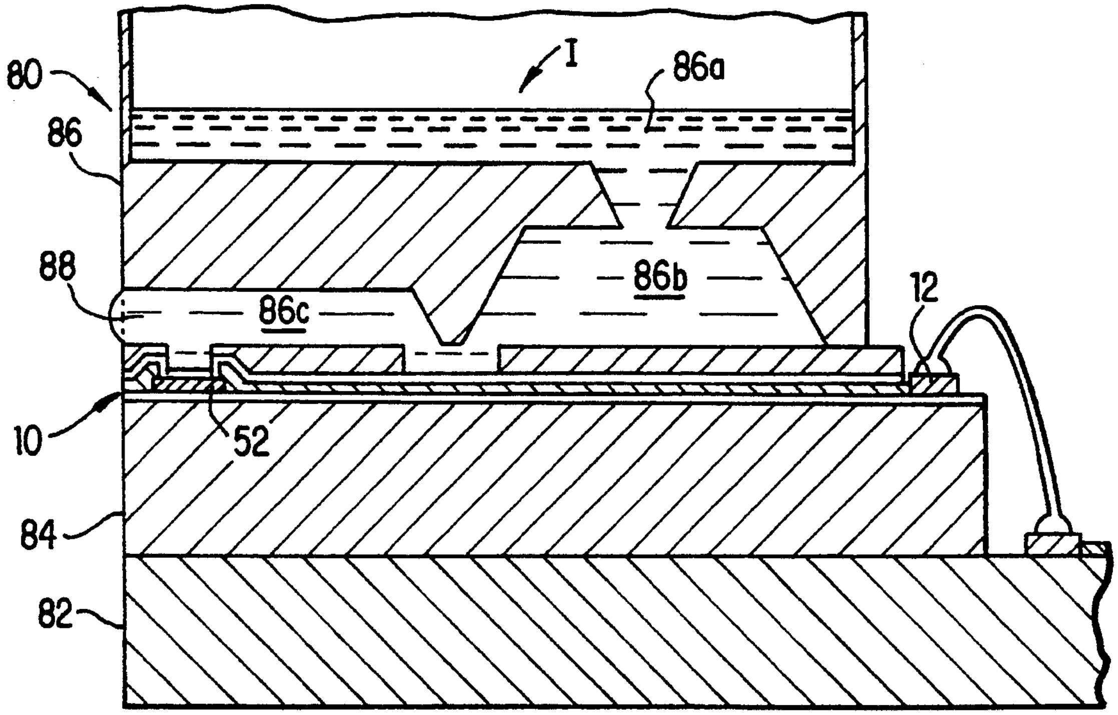
FIG. 5 is a sectional view of the thermal ink jet printhead of FIG. 4.

As shown in FIG. 5, the top portion 86 of the printhead 80 includes an ink reservoir 86*a*. The liquid ink I to be ejected by the printhead 80 is placed into the ink reservoir 86*a*, flows through a first ink channel portion 86*b* and into a second ink channel portion 86*c*. Once in the second ink channel portion 86*c*, the liquid ink comes in contact with a heater element 52 formed in the surface layer 10 of the heater die 84. The heater element 52 heats the ink above the vaporization temperature of the ink. When the ink vaporizes, a bubble is formed causing a droplet of the ink I to be ejected from the nozzle 88.

Because the heater element 52 generates the ink bubble by rapidly heating the ink, the temperature of the printhead 80 generally increases as the printhead is used to print an image on the paper 90. To function properly, the printhead should remain as cool as possible, and should maintain a temperature less than 45° to 55° C.

Figure 1:
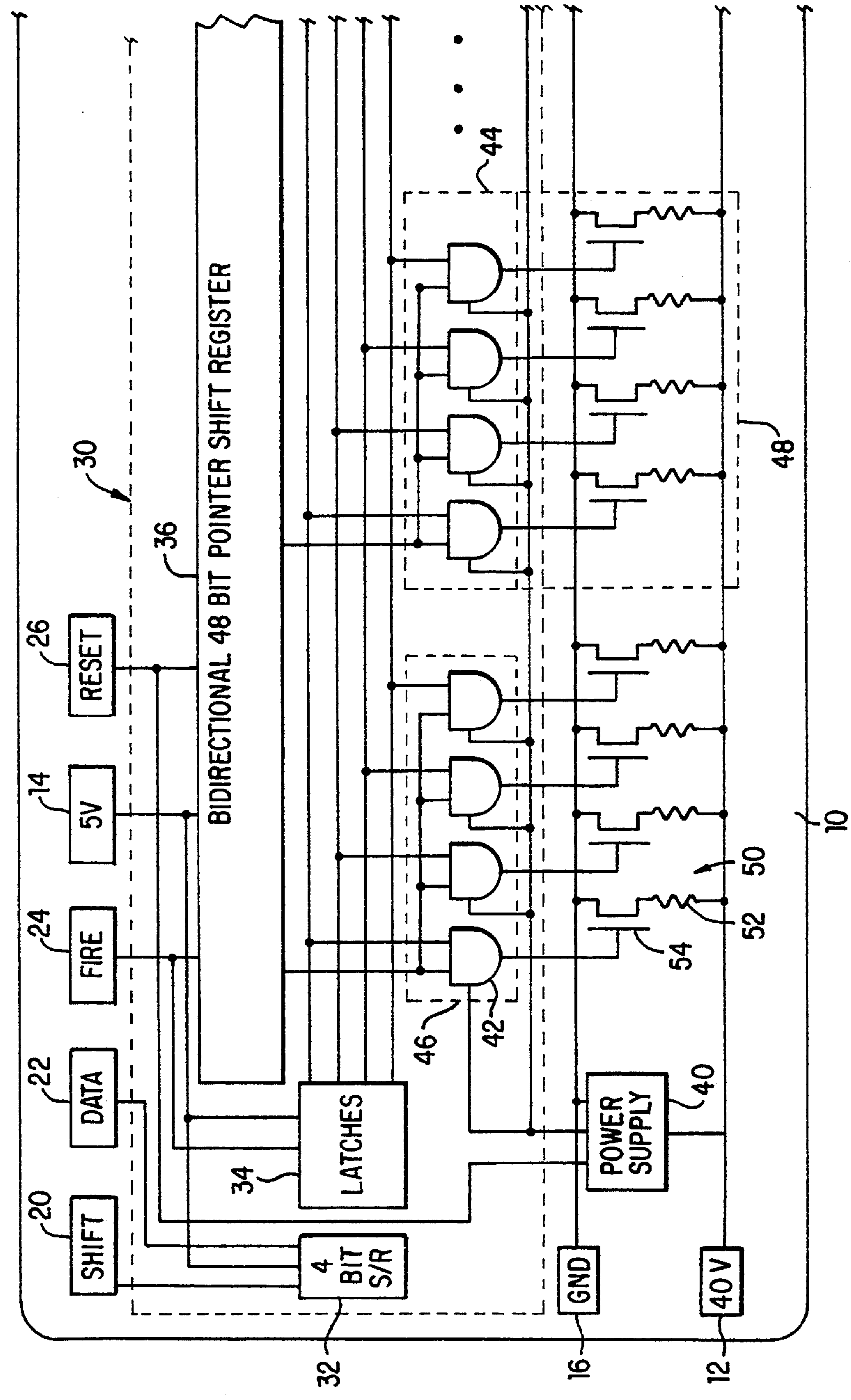
FIG. 1 shows a portion of the heater die.

As shown in FIG. 1, the heater die 84 comprises a high voltage power input terminal 12 formed on the surface layer 10. The high voltage power input terminal 12 supplies power to the resistive heater elements 52. The voltage supplied to the high voltage power input terminal 12 is preferably 40 volts. The heater die 84 also includes a low voltage power input terminal 14 for supplying logic level voltage to the logic circuitry 30. The low voltage logic level power input terminal 14 is preferably supplied with 5 volts. The heater die 84 also has a ground input terminal 16 for connecting the heater die 84 to ground.

To provide data and control signals to the logic circuitry 30 of the heater die 84, the heater die 84 includes a shift signal input terminal 20, a data input signal terminal 22, a fire input signal terminal 24 and a reset input signal terminal 26. The logic circuitry 30 includes a 4-bit serial-in/parallel-out shift register 32, and a latch 34 for latching the parallel data output from the shift register 32, and a bi-directional 48-bit shift register 36. The shift register 32 is connected to the shift signal input terminal 20 and the data input signal terminal 22. The data signal input through the data input signal terminal 22 indicates which ones of a set of 4 heater elements 52 are to fire. A logic level high signal indicates the corresponding heater element 52 is to fire, while a low logic level signal indicates the corresponding heater element 52 is not to fire. As each logic level signal is input through the data input terminal 22, the shift signal input to the shift signal input terminal 20 causes the shift register to store the data signal and shift once.

After 4 data signals and shift signals are input through the shift signal input 20 and the data input terminal 22, the fire signal is input through the fire signal input terminal 24. The fire signal causes the bidirectional 48-bit shift register 36 to shift one position. Each position of the bi-directional 48-bit shift register 36 controls the firing of a set 44 of 4 heater circuits 50. Preferably, the bi-directional 48-bit shift register 36 is set up to have one bit at a high logic level and the other 47 bits at a low logic level. Accordingly, as the 48-bit shift register 36 is shifted, the single high logic level bit is rotated through the shift register 36 to enable one of the sets 44 of the heater circuits 50. Accordingly, in the preferred embodiment of the invention, a total of 192 heater circuits 50 are provided.

As the fire signal causes the bi-directional 48-bit shift register 36 to shift one position, it simultaneously causes the latch 34 to latch in the new data currently stored in the 4-bit shift register 32. In this manner, each one of the 4 predrivers 46 corresponding to the set 44 of 4 heater circuits 50 selected by the bi-directional 48-bit shift register 36 are provided with a high logic level signal from the shift register and a high or low signal from the latch 34. If the data from the latch 34 is high, the corresponding predriver 46 outputs a high signal, causing the MOS power driver 54 to connect the resistive heater element 52 to ground. As the resistive heater element 52 is already connected to the high voltage power input terminal 12, current flows through the resistive heater element 52, causing it rapidly heat up. This causes the ink in the corresponding ink channel 86*c* to vaporize and expel a drop of ink from the corresponding nozzle 88.

In order for the thermal ink jet printhead to properly eject a drop of ink, approximately 200 mA of current is required for 3 μs. Unfortunately, simply driving the MOS power drivers 54 at the 5 volt logic level will not turn them on strongly enough to permit 200 mA of current to flow through the resistive heater 52 within the 3 microsecond window. Accordingly, it is necessary to boost the 5 volt logic levels coming from the latch 34 and the bi-directional 48-bit shift register 36 to at least 10 volts. To boost the logic levels from 5 volts to at least 10 volts, a logic gate and a predriver 46 are combined to generate the control signals for the MOS power drivers 54.

Figure 2:
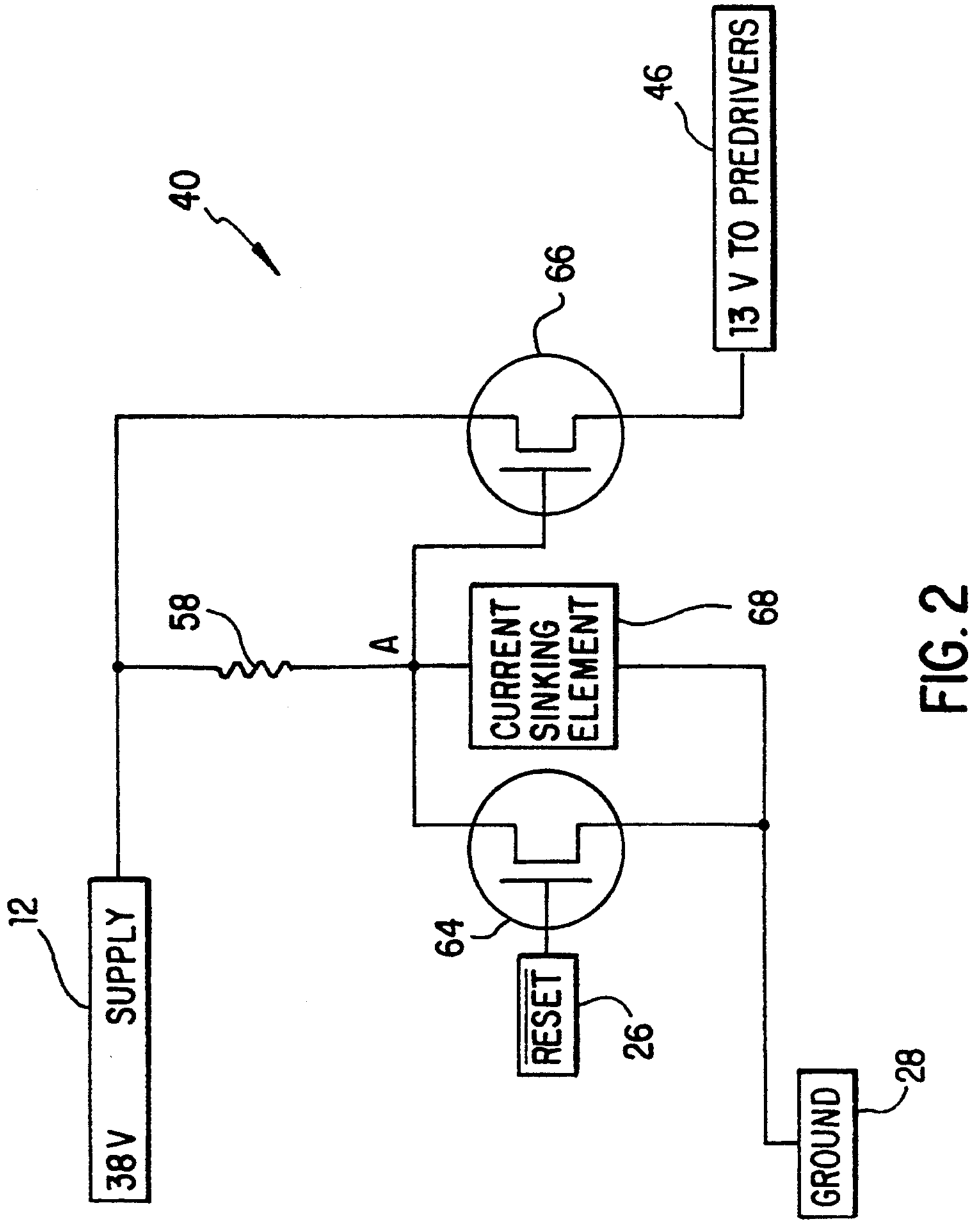
FIG. 2 shows a preferred embodiment of the switched power supply.

However, these predrivers 46 require an approximately 13 volt power supply 40 in order to boost the voltage of the control signals from the latch 34 and the shift register 36 to the MOS power drivers 54 from 5 volt logic levels to at least 10 volts. As shown in FIG. 2, the 13 volt power signal to the predrivers can be generated by a simple source-follower MOSFET circuit. The power supply 40 comprises a MOSFET 66 having its drain connected to the high voltage input terminal 12. A voltage divider comprising resistor 58 and current sinking element 68 steps down the high voltage signal input through high voltage power input terminal 12 to approximately 15 volts at the intermediate point A of the voltage divider. The gate of the MOSFET 66 is connected to the voltage divider at the intermediate point A to provide the MOSFET 66 with the approximately 15 volt signal. The source of the MOSFET 66 is connected to the predriver sections 46 as a source-follower and provides an approximately 13 volt output signal.

If the power supply 40 comprised merely the voltage divider formed by the resistor 58 and the current sinking element 68 connected between the high voltage power input terminal 12 and ground 16, a 15 volt signal would be continuously applied to the gate of the MOSFET 66. Accordingly, the MOSFET 66 would continuously provide the 13 volt signal to the predriver sections 46. The predriver sections 46 would therefore be continuously operating, even if the printer 70 was in the stand-by mode between printing operations. This raises the temperature of the printhead to approximately 30°–35° C. when the printer is in the stand-by mode.

However, as the printer 70 is not currently printing in the stand-by, there is no need to continuously supply power to the predriver sections 46. The inventors of the invention have determined that when the printer 70 is in the stand-by mode, the logic circuitry 30 consumes approximately 20 mA at 5 volts, while the 48 predriver sections 46 consume approximately 10 mA at 40 volts. This means that the logic circuitry consumes approximately 100 mW to come while the predriver circuitry consumes approximately 400 mW. Accordingly, the predriver circuitry 46, which need not be on when the printer 70 is in the stand-by mode, accounts for approximately 80% of the 500 mW stand-by mode power consumption. Additionally, when the printer 70 is in the stand-by mode, the ink I cannot be used to help carry away the excess heat through the ejected drops. Accordingly, when the printer 70 is in the stand-by mode, the temperature of the printhead 80 rises due to the approximately 500 mW stand-by power dissipation. As noted above, this causes a number of problems including loss of prime and dry-out of the ink.

Accordingly, in the first preferred embodiment of the present invention, the power supply 40 is modified to include a second MOSFET 64 connected in parallel with the current sinking element 68 between the intermediate point A and ground. Thus, when the MOSFET 64 conducts, the intermediate point A is connected directly to ground, thereby removing the 15 volt signal from the MOSFET 66. This switches off the predriver sections 46 by removing their power supply. In the first preferred embodiment, the FET 64 is an NMOS FET which will conduct only when a signal of at least approximately 5 volts is applied to its gate. Thus, if the gate of the MOSFET 64 were connected to one of the 5 volt logic level input terminals, a switching signal could be provide to the MOSFET 64.

When the printer 70 is put into the stand-by mode, the bi-directional 48-bit shift register 36 is reset by putting a low logic signal onto the reset input signal terminal 26. Preferably, the bi-directional 48 bit shift register 36 resets on the rising edge of the reset signal from the reset signal input terminal 26. The reset signal can be held low during the stand-by mode and can be held high during the printing mode. Thus, by connecting the gate of the MOSFET 64 through an inverter to the reset signal input terminal 26, the FET 64 will be turned on when the reset signal is held low during the stand-by mode and will be turned off when the reset signal is held high. Thus, the predriver sections 46 are turned off during the stand-by mode and the stand-by power dissipation is reduced from approximately 500 mW to approximately 100 mW. This reduction in power consumption during the stand-by mode avoids the overheating of the printhead 80 and the resulting problems of loss of prime or ink dry-out. With the intermediate power supply 40 switched off in the stand-by mode, the printhead temperature remains in a preferred range of 22°–24° C.

In the first preferred embodiment, the current sinking element 68 is a resistor. A resistor is used as it is simple to manufacture. Preferably, the resistors 58 and 68 are formed from polysilicon, which allows a sufficiently high resistance to be formed. A high total resistance, and a high resistance value for the resistor 58 are important, as the current flow through the resistor 58 is preferably equal to or less than 1 mA. This ensures that the power consumption in the power supply 40 is minimal. Additionally, the resistor 58 and the current sinking element 68 can be formed of lightly doped silicon ($n-$) or by heavily doped ($n+$) silicon. However, these are not preferred, as the resistance of the $n^-$ device can change with a change in bias and the $n^+$ device can break down at low voltages.

Alternately the current sinking element 68 could be a zener diode (or any structure which provides zener diode-like action). For example the current sinking element could be an enhancement mode MOSFET with its gate and source tied to ground. This zener diode embodiment provides additional benefits over the resistor embodiment. Primarily, the zener diode 68 will help ensure that voltage spikes or the like in the high voltage power signal do not cause breakdown in the predrivers 46, even when the predrivers 46 are operated close to their breakdown voltage. Further, the voltage supplied to the predrivers 46 becomes independent of the actual level of the high voltage power signal. Thus, the high voltage power signal can be varied to provide additional control to the operation of the printer.

In a further embodiment, the control signal to the MOSFET 66 can be generated by any logic combination of the control signals. Alternatively, a dedicated control signal input terminal connected to the MOSFET 66 can be used. The dedicated control signal input through an additional control signal input terminal would be used to directly control the MOSFET 66.

Additionally, it is important to construct the power supply such that rapid changes in the high voltage power input signal do not generate spurious fire signals to the heater circuits 50. Such spurious fire signals can occur when the power supply 40 is switched off and the high voltage power input signal changes rapidly. In this state, Miller capacitance effects on the MOSFET 64 generate a voltage on the gate of the MOSFET 64.

Finally, it is understood that the power MOS driver 54 can be replaced with any driver transistor or switching transistor, such as, for example, a bipolar transistor. Likewise, the MOSFETs 64 and 66 and the predriver circuitry 46 can be replaced with any type of switching transistor or drive transistor.

While the invention has been described in connection with the preferred embodiment, it will be understood that it is not intended to limit the invention to these embodiments. On the contrary, it is intended to cover all alternatives, modifications and equivalents as may be included within the spirit and scope of the invention as defined by the appended claims.

What is claimed is:

1. A thermal ink jet printhead having a printing mode and a switched stand-by mode, said thermal ink jet printhead associated with a primary power supply, comprises:

- a plurality of control signal terminals inputting logic control signals;
- at least one power input terminal receiving a first voltage from said primary power supply;
- a plurality of heater circuits, each comprising a heater element connected in series with a transducer and connected between one of the at least one power input terminal and ground;
- logic circuitry connected to the plurality of control signal terminals;
- a plurality of predriver circuits, an output of each predriver circuit connected to the transistor of a corresponding one of the plurality of heater circuits and inputs of each predriver circuit connected to outputs of the logic circuitry; and a predriver power supply connected between the power input terminal and each of the plurality of predriver circuits and outputting a second voltage different than the first voltage, the predriver power supply being connected to at least one of the plurality of control signal terminals and comprising a switch, wherein a control signal input through the at least one control signal terminal switches the predriver power supply to an off state when the printhead is in the stand-by mode and switches the predriver power supply to an on state when the printhead is in the printing mode.

2. The thermal ink jet printhead of claim 1, wherein: the predriven power supply comprises a source follower connected to said one of the at least one power input terminal, a voltage divider circuit connected between said one power input terminal and ground, a gate of the source follower connected to an intermediate point of the voltage divider circuit, and wherein the switch comprises a switchable circuit element connected between the intermediate point and ground.

3. The thermal ink jet printhead of claim 2 wherein the voltage divider comprises a resistor element connected between said one power input terminal and the intermediate point and a current sinking element connected between the intermediate point and ground.

4. The thermal ink jet printhead of claim 3, wherein the resistor element comprises a resistor.

5. The thermal ink jet printhead of claim 4, wherein the resistor is formed from one of a polysilicon material, a lightly doped material and a heavily doped material.

6. The thermal ink jet printhead of claim 3, wherein the current sinking element is one of a resistor and a zener diode element.

7. The thermal ink jet printhead of claim 6, wherein the zener diode element is one of a zener diode and a transistor.

8. The thermal ink jet printhead of claim 2, wherein the switchable circuit element is an enhancement mode transistor.

9. The thermal ink jet printhead of claim 8 wherein the control signal comprises an inverted reset signal.

10. The thermal ink jet printhead of claim 2 wherein the control signal comprises an output signal output from the logic circuitry.

11. The thermal ink jet printhead of claim 10, wherein the output signal comprises a logical combination of at least one logic control signal input through the plurality of control signal terminals.

12. The thermal ink jet printhead of claim 11 wherein the at least one logic control signal comprises a reset signal, and the output signal comprises an inverted reset signal.

13. The thermal ink jet printhead of claim 2, comprising an additional control signal terminal inputting a dedicated switch control signal, the switchable circuit element connected to the additional control signal input terminal.

14. The thermal ink jet printhead of claim 1, wherein the transistor is one of a drive transistor and a switching transistor.

15. The thermal ink jet printhead of claim 1, wherein the transistor is a power MOS driver transistor.

* * * * *